United States Patent [19]
Itoh et al.

[11] 3,962,863
[45] June 15, 1976

[54] GAS TURBINE ENGINE FUEL SUPPLY CONTROL

[75] Inventors: Takane Itoh, Yokohama; Takao Kamide, Zushi, both of Japan

[73] Assignee: Nissan Motor Co., Ltd., Yokohama, Japan

[22] Filed: Nov. 26, 1974

[21] Appl. No.: 527,373

[30] Foreign Application Priority Data

Nov. 28, 1973 Japan............................ 48-132557
Nov. 28, 1973 Japan............................ 48-132558
Nov. 28, 1973 Japan............................ 48-132559

[52] U.S. Cl. ................................................ 60/39.14
[51] Int. Cl.² ................................................ F02C 7/26
[58] Field of Search .................................. 60/39.14

[56] References Cited
UNITED STATES PATENTS

| | | |
|---|---|---|
| 2,880,790 | 4/1959 | Mock............................ 60/39.14 |
| 3,059,427 | 10/1962 | Thorpe et al. .................. 60/39.14 |
| 3,469,395 | 9/1969 | Spitsbergen et al. ............ 60/39.14 |
| 3,834,158 | 9/1974 | Oppmann....................... 60/39.28 R |

*Primary Examiner*—Carlton R. Croyle
*Assistant Examiner*—L. J. Casaregola

[57] ABSTRACT

Fuel supply control means is operatively connected to an electromagnetic flow control valve applying thereto a fuel control signal for controlling fuel flow supplied through the electromagnetic flow control valve to the combustion chamber of a gas turbine engine. The control signal increases gradually or exponentially from a low value such as corresponds to fuel flow required at engine hot start to a high value corresponds to fuel flow required at engine cold start.

11 Claims, 9 Drawing Figures

GAS TURBINE ENGINE FUEL SUPPLY CONTROL

This invention relates generally to a gas turbine engine fuel supply control, and more particularly a gas turbine engine fuel supply control during its initial operation and subsequent full range operation.

It is generally known that there are two fuel supply controls for a gas turbine engine for its initial operation, that is, an open loop control for engine firing and a closed loop control after firing. The first one applies a constant electrical signal to an electromagnetic flow control valve arranged between a fuel pump and a combustion chamber controlling fuel flow passing therethrough by varying its valve opening. The constant electrical signal represents optimum fuel flow determined by engine temperature immediately before firing. The engine temperature is sensed through suitable temperature-sensitive means. Whilst, the second one employs a feedback technique for bringing the actual engine speed up to a preselected one such as an idling speed, that is, the difference between the actual and preselected engine speeds is detected and then an electrical signal corresponding to the difference is applied to the flow control valve to supply the corresponding amount of fuel to the combustion chamber until the engine speed reaches the preselected one. In the above, it is necessary to change the control from the first control to the second for controlling fuel supply from engine firing to idling.

However, several defects are encountered in the prior art as discussed below. First, in the first control, it is usually very difficult that the engine mounted sensing means senses an accurate engine temperature immediately before, resulting in supplying an improper fuel quantity to the combustion chamber. Further, even if a plurality of sensors is mounted on the engine to obtain a more exact value by taking an average of the temperatures sensed thereby, an overall control system becomes complicated in its arrangement and also is expensive to manufacture. Furthermore, it is difficult to determine an accurate time point when the first control system should be changed to the second one to avoid undesirable rapid change of fuel flow to the combustion chamber.

It is therefore an object of the present invention to provide a fuel control for a gas turbine engine which overcomes the above-mentioned defects.

It is another object of the present invention to provide a fuel supply control for a gas turbine engine which employs no temperature-sensitive means for sensing engine temperature at engine firing.

It is another object of the present invention to provide a fuel supply control for a gas turbine engine for firing, wherein the fuel control signal increases gradually and continuously from a first preset value to a second preset one. The first and second preset values represent fuel quantity required at least at hot and cold engine starts, respectively.

It is a further object of the present invention to provide a gas turbine engine fuel supply control, wherein a closed loop control is carried out from engine firing.

It is a still further object of the present invention to provide a gas turbine engine fuel supply control, wherein an open loop control is changed to a closed loop one when the control signals therefrom become equal.

These and other objects, features and many of the attendant advantages of this invention will be appreciated more readily as the same becomes better understood by reference to the following detailed description, when considered in connection with the accompanying drawings, wherein like parts in each of the several figures are identified by the same reference characters, and wherein:

Figure 1:
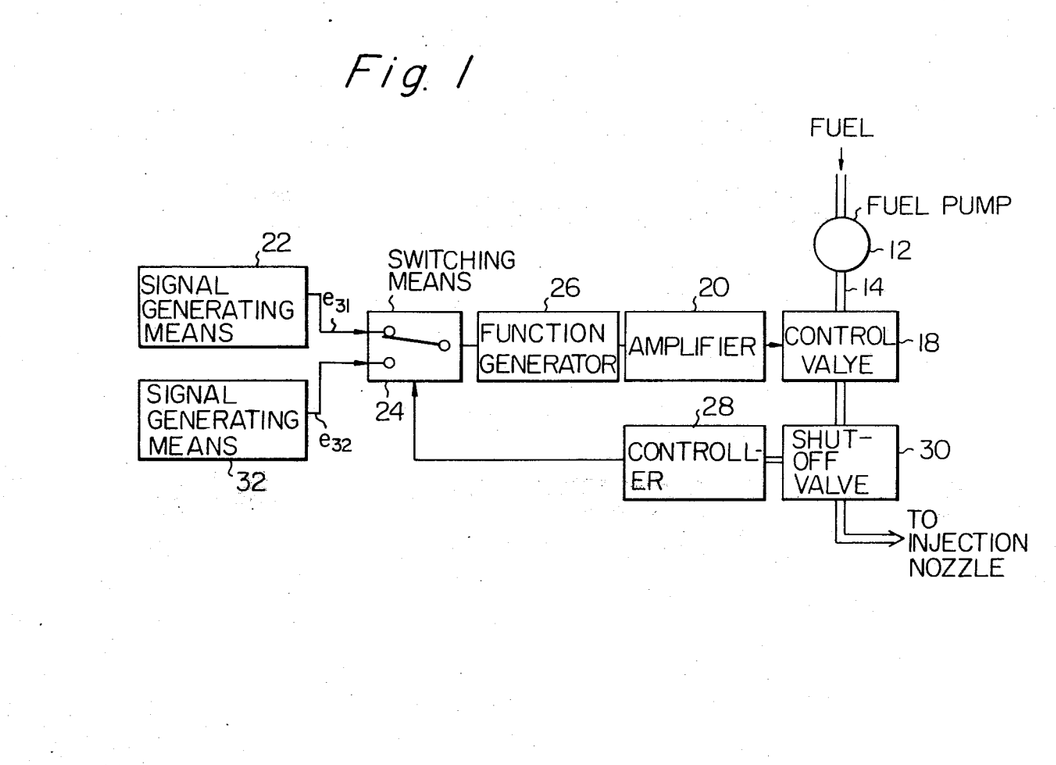
FIG. 1 shows schematically in block diagram a preferred embodiment of a gas turbine engine fuel supply control in accordance with the present invention.

Referring now to FIG. 1, there is illustrated schematically in block diagram an improved fuel supply control system for firing a gas turbine engine. As an example, a fuel pump 12 is arranged in a conduit 14 to supply pressurized fuel to injection nozzles (not shown) in the combustion chamber of the gas turbine engine. An electromagnetic flow control valve 18 is connected between the fuel pump 12 and a shut-off valve 30, and controlled by a fuel flow control signal fed thereto from an amplifier 20 so as to supply an optimum fuel flow for engine firing. As shown, signal generating means 22 is originally connected through switching means 24 to a function generator 26 and supplies thereto a predetermined electrical signal $e_{31}$ only while the shutoff valve 30 is closed. The signal $e_{31}$ corresponds to fuel flow required at engine hot start, for example. A shut-off valve controller 28 is connected to the shutoff valve 30 for controlling its valve operation and producing an electrical signal representing open or closed condition of the shut-off valve 30. The signal from the shut-off valve controller 28 is fed to the switching means 24, and once the valve 30 is opened, the signal forces the switching means 24 to disconnect the signal generating means 22 from the function generator 26 and to connect another signal generating means 32 to the same.

Hence, the signal generating means 32 in turn begins to apply an electrical signal $e_{32}$ to the function generator 26. The signal $e_{32}$ corresponds to the fuel quantity reuired at engine cold start, for example. The function generator 26 then generates the control signal increasing gradually from $e_{31}$ to $e_{32}$, and applies it to the electromagnetic flow control valve 18 through the amplifier 20. As a consequence, the control valve 18 controls the fuel flow to the injection nozzles by varying its opening in response to the control signal fed thereto. It will be understood from the above that since the fuel flow to the combustion chamber is varied from that required at engine hot start to that required at cold start, the engine is fired without failure during the increase of the control signal from $e_{31}$ to $e_{32}$ without employing any temperature-sensitive means.

Figure 2:
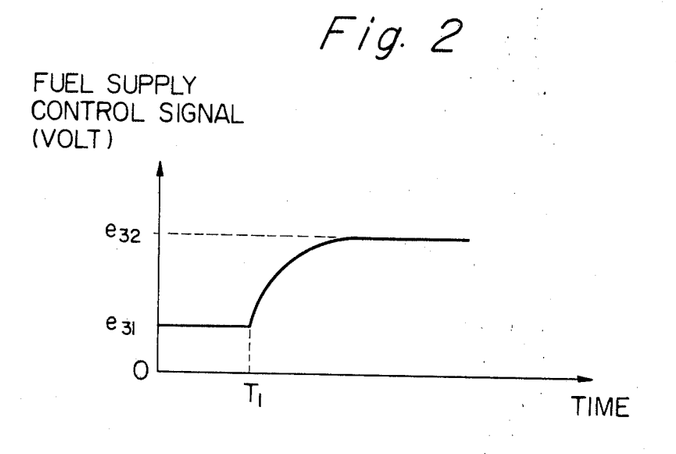
FIG. 2 shows a graph illustrating a fuel supply control signal of the FIG. 1 system.
Figure 3:
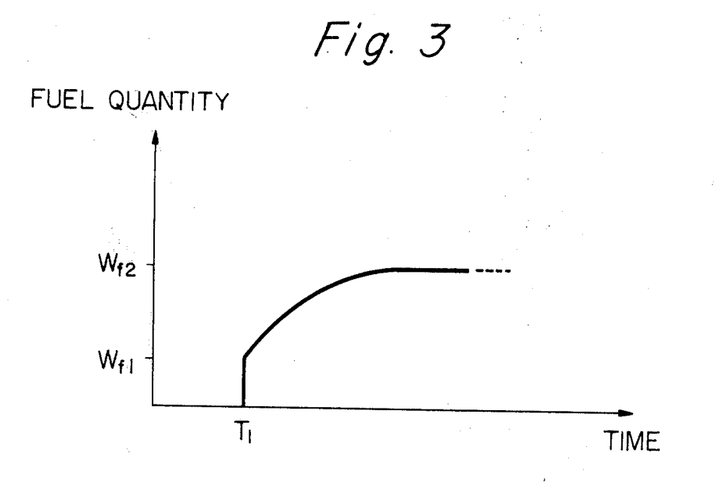
FIG. 3 shows a graph illustrating fuel supplied to the combustion chamber of a gas turbine engine of the FIG. 1 system.

Referring to FIGS. 2 and 3, there are shown two graphs to even more clearly illustrate the FIG. 1 system. FIG. 2 shows a time variation of the fuel supply control signal derived from the function generator 26, whilst FIG. 3 illustrates time variations of the amount of fuel supplied to the injection nozzle in the combustion chamber. In FIGS. 2 and 3, $T_1$ on each of the abscissa designates the time point when the shut-off valve 30 is opened. As shown in FIG. 2, the fuel supply control signal has the constant value $e_{31}$ until $T_1$ and then increases gradually or exponentially up to another constant value $e_{32}$ as previously mentioned. Whilst, the fuel quantity supplied to the combustion chamber remains zero until $T_1$ since the shut-off valve 30 is closed until that time, and then jumps to $w_{f1}$ and increases up to $w_{f2}$ in a manner similar to the FIG. 2 curve. In FIG. 3, $w_{f1}$ and $w_{f2}$ denote fuel quantities required at engine hot and cold starts, respectively. In the above description, fuel flow is varied from $w_{f1}$ to $w_{f2}$ after $T_1$, however, it is to be noted that the fuel supply control signal can be modified such that fuel flow is increased from $w_{f1}$ to $w_{f3}$ or from zero to $w_{f3}$ after $T_1$.

Figure 4:
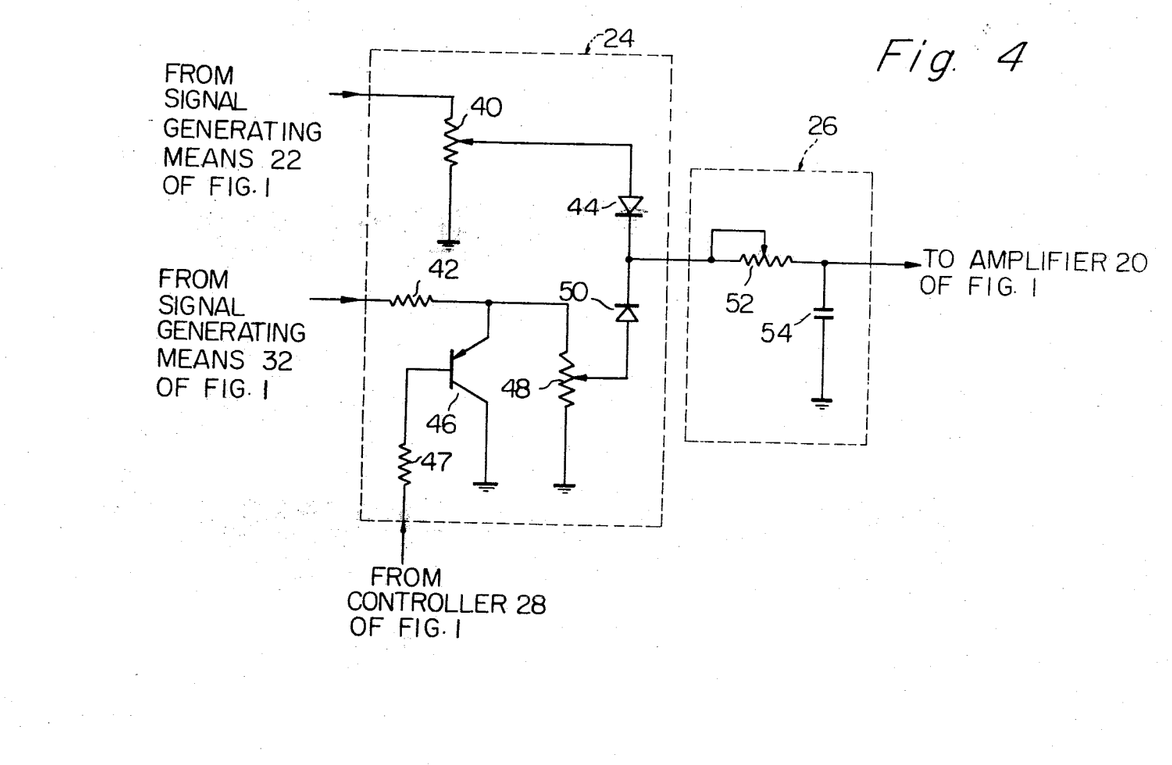
FIG. 4 shows a detail electrical circuitry of components of the FIG. 1 system.

FIG. 4 illustrates a detailed circuitry of the switching means 24 and the function generator 26 of FIG. 1. While the shut-off valve 30 remains closed, the shut-off valve controller 28 supplies an electrical signal to the base of a transistor 46 such that the transistor 46 is maintained conductive. Under such condition, a diode 50 is reversely biased because its anode is nearly zero, so that the signal generating means 22 charges a condenser 54 of the function generator 26 up to the potential $e_{31}$ through variable resistors 40 and 52 and a diode 44. Thereafter, when the shut-off valve 30 is opened at ignition, the shut-off valve controller 28 applies a signal to the base of the transistor 46 such that the transistor 46 is rendered nonconductive. In this case, the resistance values of a resistor 42 and the variable resistors 40 and 48 are previously determined such as to shut off the diode 44 and to make the diode 50 conductive. Therefore, the signal generator 32 begins to charge the condenser 54 and the function generator 26 generates the fuel control signal in a fashion of time lag of first order as shown in FIG. 2. It is to be noted that the transient curve of FIG. 2 is readily modified by varying the resistance of the variable resistor 5.

Figure 5:
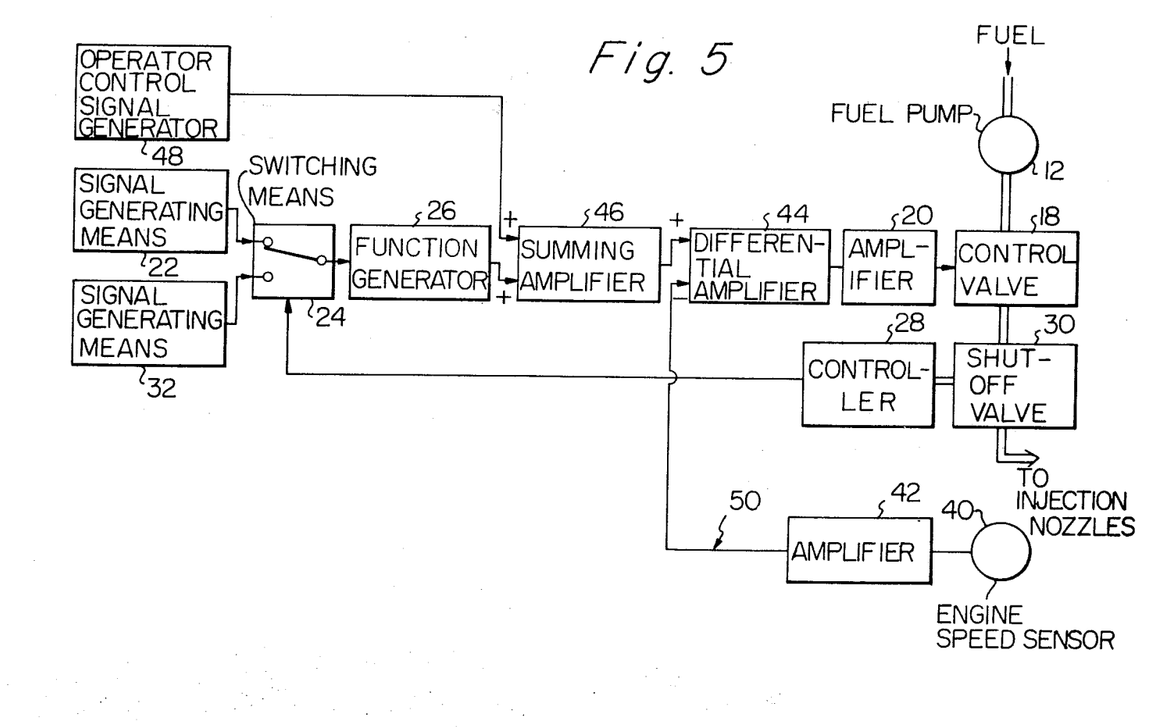
FIG. 5 shows schematically in block diagram another preferred embodiment of a gas turbine engine fuel supply control in accordance with the present invention.
Figure 6:
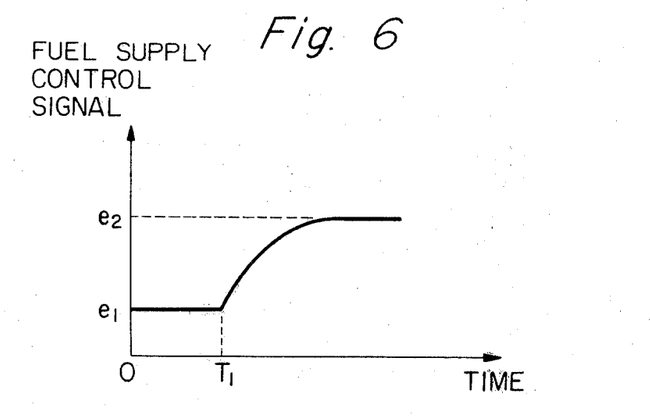
FIG. 6 shows a graph illustrating a fuel control signal of the FIG. 5 system.

FIG. 5 illustrates schematically in block diagram a modification of the FIG. 1 control system in accordance with the present invention, wherein a closed loop system is employed for fuel supply control from engine starting. As seen by comparison of FIG. 5 with FIG. 1, the important difference therebetween is that the former incorporates therein a closed loop or negative feedback loop and also an operator control system including an operator control signal generator 48 and a summing amplifier 46. As previously described with FIG. 1, the signal generating means 22 is originally connected to the function generator 26 and thereafter disconnected therefrom upon opening of the shut-off valve 30. At the same time, the signal generating means 32 is in turn connected to the function generator 26 by means of the switching means 24. Thus, the function generator 26 begins to develop the fuel flow control signal similar to that shown in FIG. 2 except that the control signal increases exponentially up to a value corresponding to fuel quantity required at engine idling. This is because the signal generating means 32 is scheduled to generate a signal of that value. The curve of the control signal derived from the function generator 26 of FIG. 5 is shown in FIG. 6 wherein $e_1$ and $e_2$ denote electrical values corresponding to fuel quantities required at hot start and idling of the engine, respectively. In FIG. 6, $T_1$ on the abscissa denotes the time point when the shut-off valve 30 is opened as in FIG. 2. As shown, an engine speed sensor 40 is newly added to the FIG. 1 circuit together with an amplifier 42 and a differential amplifier 44 to complete a negative feedback loop 50. Therefore, in the FIG. 5 control system, an output derived from the engine speed sensor 40 is superimposed upon the differential amplifier 44 in such a way as to oppose the signal applied from the function generator 26 through the summing amplifier 46. By properly carrying out this operation, undesirable variations in the engine speed can be reduced to a minimum. Consequently, the actual engine speed is gradually increased along the schedule of the control signal fed to the electromagnetic flow control valve 18.

As mentioned above, the operator control signal generator 48 is also added to the FIG. 1 system together with the summing amplifier 46 which is connected between the function generator 26 and the differential amplifier 44 as shown in FIG. 5. The operator control signal generator 48 generates a fuel control signal at the will of the operator, which is fed to the summing amplifier 46 and added thereat to the signal from the function generator 26 and then amplified to the value as determined by the parameters concerned. The operator control signal generator 48 is employed after the engine speed reaches idling. In this case, it is understood that undesirable engine speed variations are also reduced to minimum due to the negative feedback operation.

In the above, the gains of the amplifiers 20, 42, 44, and 46 are properly determined so as to perform the operation of the FIG. 5 system.

FIG. 6 illustrates the time variation of the fuel supply control signal derived from the function generator 26, which is already referred to in the specification.

Figure 7:
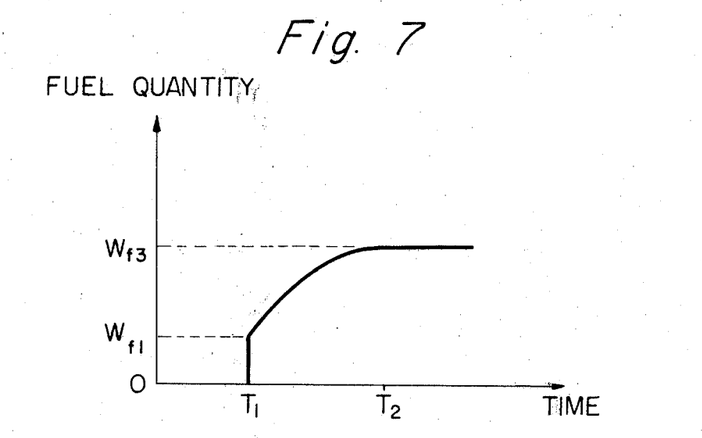
FIG. 7 shows a graph illustrating fuel supplied to the combustion chamber of a gas turbine engine of the FIG. 5 system.

FIG. 7 illustrates the time variation of fuel quantity supplied to the injection nozzles, wherein reference characters $w_{f1}$ and $w_{f3}$ denote fuel quantity required at engine hot and idling, respectively. It is to be noted that the fuel quantity increases exponentially up to $w_{f3}$ unlike in the curve of FIG. 3.

Figure 8:
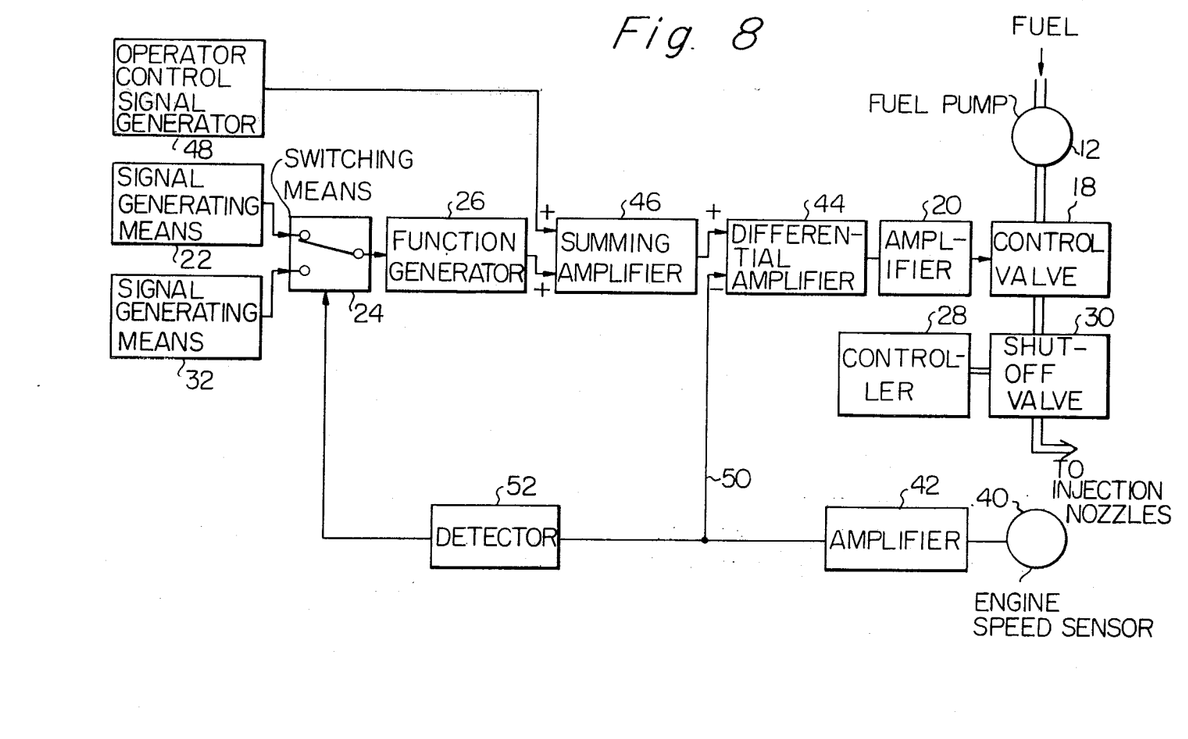
FIGS. 8 and 9 show schematically in block diagrams further preferred embodiments of a gas turbine engine fuel supply control in accordance with the present invention.

FIG. 8 illustrates a modification of the FIG. 5 control system, wherein a detector 52 is newly added and the shut-off valve controller 28 is disconnected from the switching means 24. The detector 52 is adapted to detect that the speed of the engine exeeds that of the starter, in other words, the engine has been started, and then developes a signal representing the condition of the engine operation, which is fed to the switching means 24. The switching means 24, upon receiving the signal, switches the connection from the signal generating means 22 to another signal generating means 32. In the present embodiment, the fuel control signal to the electromagnetic flow control valve 18 is maintained constant before the engine speed exceeds the starter speed and begins to increase after that. Therefore, the signal generating means 32 produces a constant fuel supply control signal and the proper value thereof should be determined by engine temperature being sensed through one or more engine mounted temperature-sensitive means.

Figure 9:
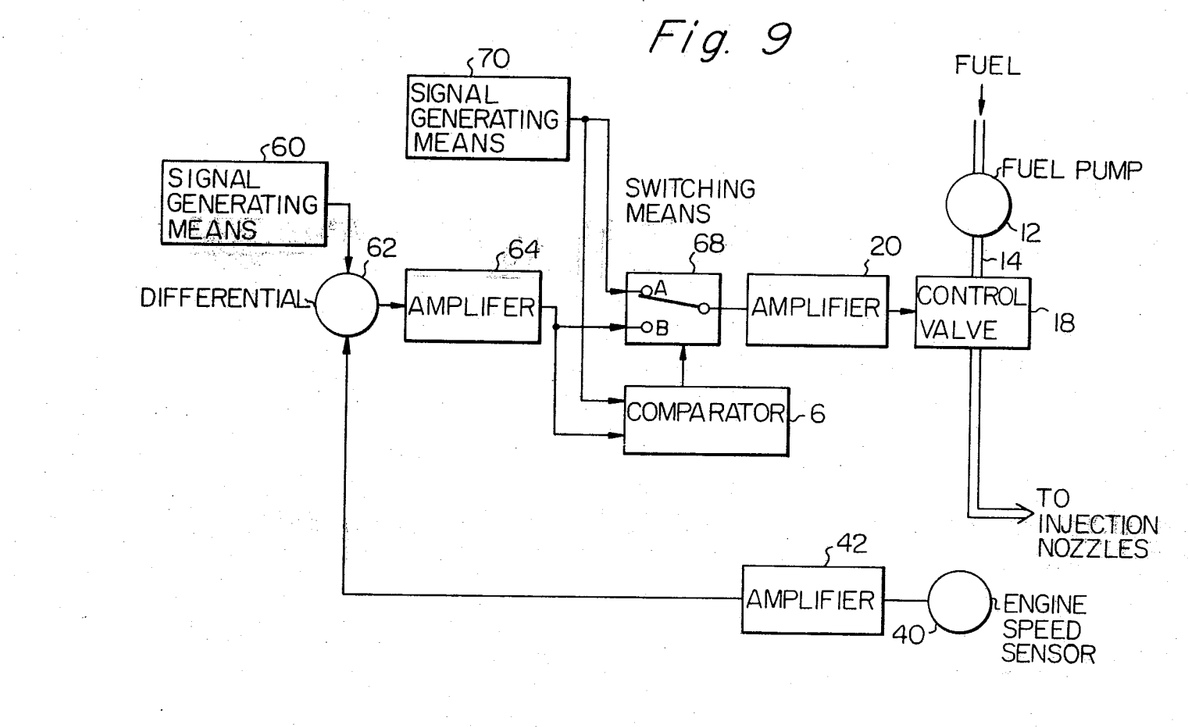

Referring now to FIG. 9, there is illustrated schematically in block diagram still another embodiment of the present invention. A fuel pump 12 is arranged in a conduit 14 for supplying pressurized fuel to injection nozzles (not shown). An electromagnetic flow control valve 18 is connected between the fuel pump 12 and the injection nozzles, and controlled by a fuel flow control signal fed thereto from an amplifier 20 so as to supply optimum fuel flow to the injection nozzles. As shown, control signal generating means 70 is originally connected to the flow control valve 18 through switching means 68 and the amplifier 20, and applying a fuel control signal corresponding to fuel quantity required at engine firing. An engine speed sensor 40 is mounted on a suitable portion within the engine to sense engine speed and producing an electrical signal proportional thereto. Output from the engine speed sensor 40 is fed through an amplifier 42 to a differential amplifier 62 which also receives a signal of a constant value from a signal generating means 60. The differential amplifier 62 produces an output proportional to the difference between the two kinds of signals fed thereto and applies its output to an amplifier 64. As shown, a comparator 66 receives two kinds of signals from the amplifier 64 and the control signal generating means 70, and compares the magnitudes thereof. If the signal from the amplifier 64 is smaller than or equal to that from the control signal generating means 70, the comparator 66 generates a signal and applies it to the switching means 68 in order to disconnect the signal generating means 70 from the amplifier 20 and connect the amplifier 64 to the same.

In operation, it is assumed that the engine is cranked by a suitable starter mechanism (not shown) that begins rotating the compressor and turbine (not shown) of the engine up to the speed necessary for firing the engine. At this time, as the engine speed is comparatively low, the output of the sensor 40 remains low. This means that the output of the differential amplifier 62 is relatively large. As a consequence, the signal from the control signal generating means 70 is small compared with that from the amplifier 64. Therefore, the control signal generating means 70 continues to apply its output to the control valve 18. After the engine is fired, the engine speed gradually increases to decrease the output of the differential amplifier 62. Finally, when the output of the differential amplifier 62 is lowered to or below that from the control signal generating means 70, the comparator 66 generates a signal which is fed to the switching means 68 to disconnect the control signal generating means 70 from the amplifier 20 and to connect the amplifier 64 to the same. Therefore, it is understood that change from one of the two control systems to the other is performed smoothly, that is, without undesirable variations in the engine speed. After the above-mentioned switching operation is finished, the actual engine speed reaches a constant value determined by the magnitude of the output of the signal generating means 60 and the gain of the amplifier 64. From the above, it is apparent that the engine speed at the time when the switching means 68 is actuated can be varied by varying the gains of the amplifiers 64 and 42, and the differential amplifier 62. Once the switching means 68 is actuated, it maintains its condition until the next engine starting operation. In the present embodiment, the control signal generating means 70 can be replaced by the several system components of FIG. 1, i.e., the control signal generating means 22 and 32, switching means 24, and function generator 26. In this case, the shut-off valve 30 is added to the FIG. 9 embodiment in such a way as to be connected between the control valve 18 and the injection nozzles.

What is claimed is:

1. A fuel supply control for firing a gas turbine engine including a fuel pump provided in a fuel conduit for supplying pressurized fuel into a combustion chamber of said gas turbine engine, which comprises:
   an electromagnetic flow control valve provided in said fuel conduit between said fuel pump and said combustion chamber, and responsive to a control signal fed thereto from fuel supply control means for controlling fuel flow to said combustion chamber in accordance with said control signal;
   said fuel supply control means operatively connected to said electromagnetic flow control valve for supplying thereto said control signal which increases continuously in magnitude from a first preset value to a second preset value after engine starting operation;
   a shut-off valve provided in said fuel conduit between said fuel pump and said combustion chamber for blocking and unblocking delivery of said fuel flow to said combustion chamber;
   a shut-off valve controller operatively connected to said shut-off valve for opening and closing the same and for generating therefrom a signal indicative of open and closed conditions of said shut-off valve, said signal being fed to said fuel supply control means to cause the same to develop said control signal when said signal represents the open condition of said shutoff valve;
   said fuel supply control means including first control signal generating mean initially connected to function generating means through switching means for applying thereto a first present signal indicative of said first present value,
   said switching means receiving said signal from said shutoff valve controller, and disconnecting said first control signal generating means from said function generating means and connecting second control signal generating means to the latter when said signal indicates the open condition of said shut-off valve,
   said second control signal generating means generating a second present signal indicative of said second preset value, and
   said function generating means electrically interposed between said switching means and said electromagnetic flow control valve, and producing said control signal.

2. A fuel supply control for firing a gas turbine engine claimed in Claim 1, wherein said switching means comprises:
   a transistor the base of which is connected through a resistor to said shut-off valve controller for receiving said signal therefrom, said transistor being conductive while said signal indicates the closed condition of said shut-off valve and rendered nonconductive when said signal indicates the open condition thereof, the emitter of said transistor being connected to said second signal generating means and also through a first variable resistor to the anode of a first diode which is biased reversely while said transistor is conductive, the cathode of said first diode being connected to said function generating means, thereby said second signal generating means is electrically separated from said function generator while said transistor is conductive, and a second diode having a cathode connected to said function generator and the anode thereof being connected through a second variable resistor to said first signal generating means, said second diode being conductive while said transistor is conductive and rendered nonconductive when said transistor is nonconductive.

3. A fuel supply control for firing a gas turbine engine claimed in Claim 1, wherein said function generating means comprises:

a combination in series of a variable resistor and a capacitor, one terminal of which combination is connected to said switching means and the other terminal being maintained at a constant potential, an intermediate junction of said combination being connected to said electromagnetic flow control valve.

4. A fuel supply control for a gas turbine engine including a fuel pump provided in a fuel conduit for supplying pressurized fuel into a combustion chamber of said gas turbine engine, which comprises:

an electromagnetic flow control valve provided in said fuel conduit between said fuel pump and said combustion chamber, and responsive to a first control signal fed thereto from a differential amplifier for controlling fuel flow to said combustion chamber in accordance therewith;

fuel supply control means electrically connected to said differential amplifier for supplying thereto a second control signal which increases in magnitude continuously from a value corresponding to fuel quantity required at hot engine start to another value corresponding to that required at engine idling;

an engine speed sensor for producing an engine speed signal indicative of actual engine speed; and said differential amplifier electrically interposed between said electromagnetic flow control valve and said fuel supply control means, and further electrically connected to said engine speed sensor for receiving therefrom said engine speed signal and producing said first control signal proportional to the difference between said engine speed signal and said second control signal.

5. A fuel supply control for a gas turbine engine claimed in claim 4, further comprising:

a shut-off valve provided in said fuel conduit between said fuel pump and said combustion chamber for blocking and unblocking delivery of said flow to said combustion chamber; and a shut-off valve controller operatively connected to said shut-off valve for opening and closing the same and for generating therefrom a signal indicative of open or closed conditions of said shut-off valve, said signal from said shut-off valve controller being fed to said fuel supply control means to cause the same to develop said control signal when said signal represents the open condition of said shut-off valve.

6. A fuel supply control for a gas turbine engine claimed in claim 5, wherein said fuel supply control means comprises:

first control signal generating means initially connected to function generating means through switching means for applying thereto a signal indicative to said first present value;

said switching means receiving said signal from said shut-off valve controller, and disconnecting said first control signal generating means from said function generating means and connecting second control signal generating means to the latter when said signal from said shut-off valve controller indicates the open condition of said shut-off valve;

said second control signal generating means generating a indicative of said second present value; and function generating means electrically interposed between said switching means and said differential amplifier, and producing said second control signal.

7. A fuel supply control for a gas turbine engine claimed in claim 4, further comprising:

a summing amplifier electrically interposed between said fuel supply control means and said differential amplifier;

an operator control signal generator connected to said summing amplifier for applying thereto a signal which is developed by an operator after said actual engine speed reaches idling, and said summing amplifier summing said signal from said operator control signal generator and said second control signal.

8. A fuel supply control for a gas turbine engine claimed in claim 6, wherein said switching means comprises:

a transistor the base of which is connected through a base resistor to said shut-off valve controller for receiving said signal therefrom, said transistor being conductive while said signal indicates the closed condition of said shut-off valve and rendered nonconductive when said signal indicates the open condition thereof, the emitter of said transistor being connected to said second signal generating means and also through a first variable resistor to the anode of a first diode which is biased reversely while said transistor is conductive, the cathode of said first diode being connected to said function generating means, thereby said second signal generating means is electrically isolated from said function generator while said transistor is conductive, and a second diode having a cathode connected to said function generator and the anode thereof being connected through a second variable resistor to said first signal generating means, and said second diode is conductive while said transistor is conductive and rendered nonconductive when said transistor is nonconductive.

9. A fuel supply control for a gas turbine engine claimed in claim 6, wherein said function generating means comprises:

a combination in series of a variable resistor and a capacitor, one terminal of which combination is connected to said switching means and the other terminal being maintained at a constant potential, an intermediate junction of said combination being connected to said electromagnetic flow control valve.

10. A fuel supply control for a gas turbine engine including a pressurized fuel source provided in a fuel conduit for supplying pressurized fuel into a combustion chamber of said gas turbine engine, which comrpises:

an electromagnetic flow control valve provided in said fuel conduit between said fuel source and said combustion chamber for controlling fuel flow to the latter in accordance with first and second control signals fed thereto in sequence from first and second control signal generating means, respectively;

said first control signal generating means initially connected through control changing means to said electromagnetic flow control valve and applying thereto said first control signal which indicates the fuel quantity required at engine firing;

said second control signal generating means being connected to said control changing means and applying thereto said second control signal the value of which decreases with increase of actual engine speed, said second control signal being initially set at a value indicative of engine speed above idling;

said control changing means comparing magnitudes of said first and second control signals, and disconnecting said first control signal generating means from said electromagnetic flow control valve and connecting said second control signal generating means to the latter when said magnitudes of said first and second control signals become equal.

11. A fuel supply control for a gas turbine engine claimed in claim 10, wherein said second control signal generating means comprises:

an engine speed sensor sensing actual engine speed and generating a signal commensurate therewith;

third control signal generating means generating a signal indicative of engine speed above idling; and said differential amplifier receiving said signals from said engine speed sensor and said third control signal generating means, and producing said second control signal corresponding to a differential value therebetween.

* * * * *